US011575158B2

(12) United States Patent
Yang

(10) Patent No.: US 11,575,158 B2
(45) Date of Patent: Feb. 7, 2023

(54) RECYCLING METHOD FOR OXIDE-BASED SOLID ELECTROLYTE WITH ORIGINAL PHASE, METHOD OF FABRICATING LITHIUM BATTERY AND GREEN BATTERY THEREOF

(71) Applicants: PROLOGIUM TECHNOLOGY CO., LTD., Taoyuan (TW); Prologium Holding Inc., Grand Cayman (KY)

(72) Inventor: Szu-Nan Yang, Taoyuan (TW)

(73) Assignees: PROLOGIUM TECHNOLOGY CO., LTD., Taoyuan (TW); Prologium Holding Inc., Grand Cayman (KY)

( * ) Notice: Subject to any disclaimer, the term of this patent is extended or adjusted under 35 U.S.C. 154(b) by 200 days.

(21) Appl. No.: 17/064,136

(22) Filed: Oct. 6, 2020

(65) Prior Publication Data
US 2021/0126294 A1    Apr. 29, 2021

(30) Foreign Application Priority Data

Oct. 25, 2019   (TW) ................................. 108138562

(51) Int. Cl.
  *H01M 10/42* (2006.01)
  *H01M 10/0562* (2010.01)
  *H01M 10/54* (2006.01)

(52) U.S. Cl.
  CPC ... *H01M 10/4242* (2013.01); *H01M 10/0562* (2013.01); *H01M 10/54* (2013.01); *H01M 2300/0071* (2013.01)

(58) Field of Classification Search
  CPC ......... H01M 10/4242; H01M 10/0562; H01M 10/54; H01M 2300/0071
  See application file for complete search history.

(56) References Cited

U.S. PATENT DOCUMENTS

| 2014/0227153 A1* | 8/2014 | Laucournet | C22B 26/12 |
| | | | 423/141 |
| 2016/0079623 A1* | 3/2016 | Kim | H01M 8/1246 |
| | | | 429/408 |
| 2019/0013546 A1* | 1/2019 | Visco | H01M 10/0525 |

FOREIGN PATENT DOCUMENTS

| CN | 107687018 A | * | 2/2018 | |
| JP | 2016117637 A | * | 6/2016 | C03C 1/002 |

OTHER PUBLICATIONS

English machine translation of Kunz (JP 2016117637 A) (Year: 2016).*
English machine translation of Liu (CN 107687018 A) (Year: 2018).*

* cited by examiner

*Primary Examiner* — Sarah A. Slifka
*Assistant Examiner* — Aaron J Salter
(74) *Attorney, Agent, or Firm* — Rabin & Berdo, P.C.

(57) ABSTRACT

The invention discloses a recycling method for oxide-based solid electrolyte with original phase, method of fabricating lithium battery and green battery thereof, which is adapted to recycle the solid-state or quasi-solid lithium batteries after discard. The oxide-based solid electrolyte is only used as an ion transport pathway, and does not participate in the insertion and extraction of lithium ions during charge and discharge cycles. Its crystal structure dose not be destroyed. Therefore, the original phase recycle of the oxide-based solid electrolyte is achieved without damage the structure or materials. The recycled the oxide-based solid electrolyte can be re-used to reduce the manufacturing cost of the related lithium battery.

11 Claims, 2 Drawing Sheets

RECYCLING METHOD FOR OXIDE-BASED SOLID ELECTROLYTE WITH ORIGINAL PHASE, METHOD OF FABRICATING LITHIUM BATTERY AND GREEN BATTERY THEREOF

CROSS REFERENCES TO RELATED APPLICATIONS

The present application claims priority to Taiwanese Patent Application 108138562 filed in the Taiwanese Patent Office on Oct. 25, 2019, the entire contents of which is being incorporated herein by reference.

BACKGROUND OF THE INVENTION

Field of Invention

The present invention relates to a recycling and reusing method for the lithium batteries, in particular to a recycling method for oxide-based solid electrolyte with original phase, method of fabricating lithium batteries and green batteries thereof.

Related Art

The liquid electrolyte is usually used for the existing lithium ion secondary battery as a medium for the lithium ion transport. However, the volatile nature of the liquid electrolyte may adversely affect the human body and the environment. Moreover, it is also a great security concern for the battery users due to the flammability of the liquid electrolyte.

Furthermore, one reason for the destabilization of lithium batteries is the greater surface activity of the negative electrode and the higher voltage of the positive electrode. When the liquid electrolyte is directly contacted to the electrodes, the interfaces therebetween is destabilized and the exothermic reaction is occurred to form a passivation layer. These reactions would consume the liquid electrolyte and the lithium ion and generate heat. When a local short circuit occurs, the local temperature rises rapidly. The passivation layer will become unstable and release heats. This exothermic reaction is cumulative to cause the temperature of the whole battery to continue to rise. The one of safety concerns of using a battery is that once the battery temperature is increased to a starting temperature (trigger temp.), the thermal runaway is initiated to cause an ignition or explosion of the battery. That is a major safety issue for use.

In recent years, the solid electrolytes is a focusing research. The ionic conductivity of the solid electrolytes is similar to the ionic conductivity of the liquid electrolytes, without having the property of evaporating and burning. Also, the interfaces between the solid electrolytes and the surface of active materials is relatively stable, regardless chemically or electrochemically, to greatly improve the safety of lithium batteries.

Therefore, the solid-state or quasi-solid lithium batteries are expected to replace the organic electrolyte lithium batteries, to solve the safety problems of the lithium batteries. Also, the energy density of the batteries is greatly increased through further designs.

However, with the widespread application of these lithium batteries, a large number of the used solid-state or quasi-solid lithium batteries will be accumulated. It is an important issue and an inevitable consideration in this field with the disposal of these used lithium batteries at a low cost, a low resource consumption and a relatively small environmental impact.

SUMMARY OF THE INVENTION

It is an objective of this invention to provide a recycling method for oxide-based solid electrolyte with original phase, method of fabricating lithium batteries and green batteries thereof to overcome the forgoing shortcomings. It can effectively dispose of the oxide-based solid electrolyte of the used solid-state or quasi-solid metal-ion batteries to avoid environmental pollution.

Also, it is another objective of this invention to provide a recycling method for oxide-based solid electrolyte with original phase, method of fabricating lithium batteries and green batteries thereof, which the original phase recycle of the oxide-based solid electrolyte is achieved without damage the structure or materials. Moreover, the recycled the oxide-based solid electrolyte can be re-used to a new assembly lithium battery in production line. Therefore, the manufacturing cost of the solid-state or quasi-solid metal-ion batteries is reduced.

In order to implement the abovementioned, this invention discloses recycling method for oxide-based solid electrolyte with original phase, which includes the following steps: obtaining a battery with an oxide-based solid electrolyte with an original size and an original material's characteristics; disassembling the battery to obtain a processing part including at least one electrode and the oxide-based solid electrolyte; removing an organic substance of the processing part, so that the processing part essentially remains an inorganic substance composition; separating the inorganic substance composition to obtain the oxide-based solid electrolyte; and purifying the oxide-based solid electrolyte to obtain a recycling oxide-based solid electrolyte with the original size and the original material's characteristics. By the foregoing recycling method, it can effectively dispose of the used solid-state or quasi-solid metal-ion batteries to avoid environmental pollution, and the original phase recycle of the oxide-based solid electrolyte is achieved without damage the structure or materials.

Further, the foregoing recycling oxide-based solid electrolyte can be re-used to manufacture the lithium battery. Therefore, the manufacturing cost of the solid-state or quasi-solid metal-ion batteries is reduced. Also, the manufactured green batteries can also meet environmental protection requirements to reduce resource consumption and environmental pollution.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

In this invention, it is considered that the oxide-based solid electrolyte is only used as an ion transport pathway, and does not participate in the insertion and extraction of lithium ions during charge and discharge cycles. Its size, crystal structure and material's characteristics do not be destroyed, even after repeated charging and discharging cycle. Therefore, the original phase recycle of the oxide-based solid electrolyte is achieved without damage to the structure or materials. The recycled oxide-based solid electrolyte has the states equivalent to the material initial used.

Figure 1:
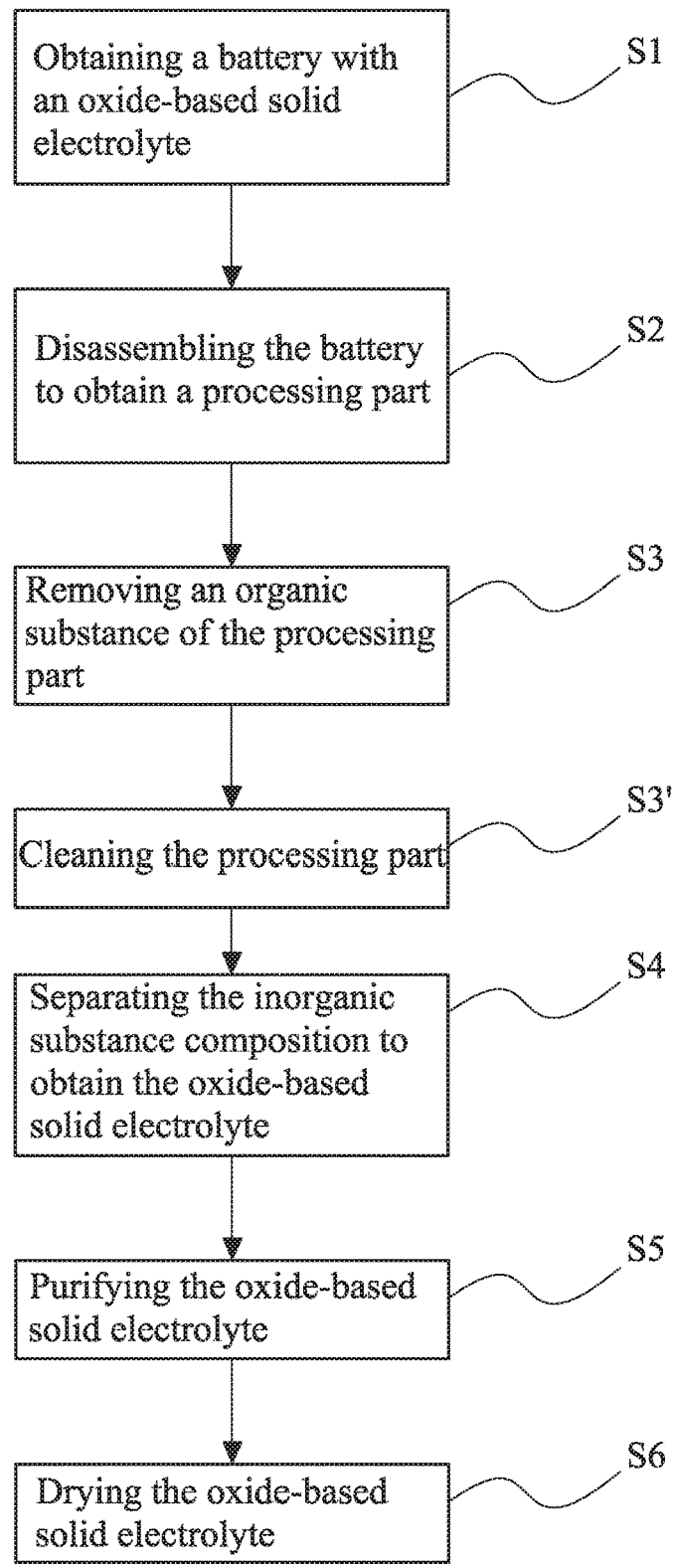
FIG. 1 is a flowchart illustrating an example of steps for recycling method for oxide-based solid electrolyte with original phase in accordance with the present invention.

Please refer to FIG. 1, which is a flowchart illustrating an example of steps for recycling method for oxide-based solid electrolyte with original phase in accordance with the present invention. Firstly, in the step S1, a battery with an oxide-based solid electrolyte is obtained. The battery includes solid-state or quasi-solid metal-ion batteries, lithium batteries for example, such as unusable after multiple charge and discharge cycles, improper manufacturing process only used for a few charge and discharge cycles, or other man-made disposal or damage. In other words, the metal-ion battery must have a certain amount of the oxide-based solid electrolyte with an original size and an original material's characteristics.

The oxide-based solid electrolyte may be a fluorite structure oxide-based solid electrolyte. For example, it may be yttria stabilized zirconia (YSZ) with molar fraction 3-10%. The oxide-based solid electrolyte may be a Perovskite structure ($ABO_3$) oxide-based solid electrolyte, such as doped $LaGaO_3$. Or, the oxide-based solid electrolyte may be $Li_{1+x+y}(Al, Ga)_x(Ti, Ge)_{2-x}Si_yP_{3-y}O_{12}$, where $0 \leq x \leq 1$ and $0 \leq y \leq 1$. Moreover, the oxide-based solid electrolyte may be $Li_2O$—$Al_2O_3$—$SiO_2$—$P_2O_5$—$TiO_2$, $Li_2O$—$Al_2O_3$—$SiO_2$—$P_2O_5$—$TiO_2$—$GeO_2$, $Na_{3.3}Zr_{1.7}La_{0.3}Si_3PO_{12}$, $Li_{3.5}Si_{0.5}P_{0.5}O_4$, $Li_{3x}La_{2/3x}TiO_3$, $Li_7La_3Zr_2O_{12}$, $Li_{0.38}La_{0.56}Ti_{0.99}Al_{0.01}O_3$, or $Li_{0.34}LaTiO_{2.94}$; or LLZO (lithium lanthanum zirconium oxide, $Li_7La_3Zr_2O_{12}$).

Figure 2:
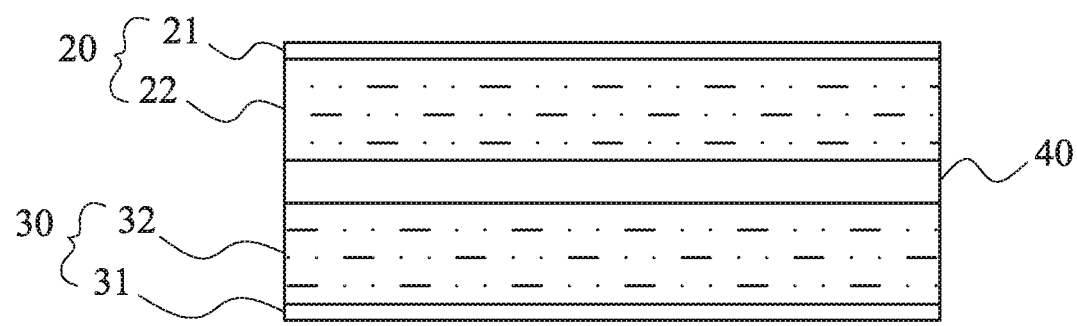
FIG. 2 is a schematic diagram of the used lithium battery in accordance with the present invention.

Then, in the step S2, the battery is disassembled to obtain a processing part, and the discharge treatment is performed if it is required. In this step, it is mainly performed a physical dissembling to dissemble the external housing, such as an aluminum foil bag, a casing, etc., mainly depends on the type of metal-ion batteries. The processing part after disassembled is mainly the cell portion, as shown in FIG. 2, which includes two electrodes 20, 30 and the solid electrolyte layer 40. According to the general structure, the electrodes 20, 30 further include the current collectors 21, 31 and the active material layers 22, 32. The drawing shown in this figure is illustrative only and not intended to be limiting. For example, the metal-ion battery may also include a separator, and the solid electrolytes may be distributed in the battery, not a layer-type. Also, the arrangement position and sequence of the current collectors 21, 31 and the active material layers 22, 32 can also be changed according to different types. Furthermore, according to different structures of the metal-ion batteries, the physical disassembling method may also involve disassembling the particle electrode, such as the metallic current collectors. It is mainly depends on the factors, such as the disassembling convenience, safety of disassembling and non-destructive of the oxide solid electrolyte. Therefore, the processing part after disassembled may include at least one electrode and the oxide-based solid electrolyte.

In the step S3, an organic substance of the processing part is removed. The removing method may be a wet process or a dry process. For example, each layer of the metal-ion battery, such as between the electrodes 20, 30, and the solid electrolyte layer 40 or between the materials within each layer, is adhered with a binder. Therefore, the wet process, is performed to dissolve at least one of the binder to make the layers or materials be separated from each other. The solvent used in the wet process can be adjusted for the organic substance to be dissolved. For example, the solvent is adjusted depend on different metal-ion batteries with different binders or the binder formulation of each layers. These adjustments are mainly aimed to separate the inorganic substances, such as the active materials, the electrically conductive material and the oxide solid electrolytes, from the organic substances, such as the binders or the polymer electrolytes. The above-mentioned dry process may be a high-temperature pyrolysis process, which is lower than the temperature at which the oxide solid electrolyte will occur the crystal variation. Therefore the processing part essentially remains an inorganic substance composition after this step.

After the above step S3, another cleaning step, step S3', can be performed to clean and remove the aforementioned the residual organic substances, the remained solvent, or the residual substances after pyrolysis process, so as to facilitate subsequent the step S4 of separating various inorganic substances to obtain the oxide solid electrolyte. The cleaning process of the step S3' is mainly to remove the dissolved organic substances, such as the binders or the polymer solid electrolytes, from the processing part. If the dissolving solvent used in the aforementioned step S3 does not affect the subsequent separation step, step S4, the step S3' can be omitted. For example, if acetone or alcohol is used to dissolve and remove the organic substances, the acetone or alcohol will volatilize by itself. Therefore, there is no need to perform step S3'. However, if the cleaning solvent used in this step S3' does not volatilize by itself, a heating treatment at the temperature 400-500° C. can be used to remove the residual organic substances, which may include the solvent and the residual binder, etc., on the processing part.

In the step S4, the oxide-based solid electrolyte is separated from the remaining inorganic substance composition. After the above-mentioned steps, the remaining inorganic substances may include the active materials, the solid oxide electrolytes, the electrically conductive materials, etc. The remaining inorganic substance composition depends on the battery usage status, such as the amount of repeated charging and discharging cycles, and the type of the metal-ion battery. Specifically, a screening process by a centrifugal force may be used. On the other hand, the aforementioned solid components are separated based on sizes and/or densities under the centrifugal force. Then the oxide-based solid electrolyte is obtained by screening process.

Then, the oxide-based solid electrolyte is purified in step S5 to obtain a recycled oxide-based solid electrolyte which has the original size and the original material's characteristics. To clean the impurities on the surface of the oxide-based solid electrolyte or the remaining compositions of the battery, a deionized water, an organic solvent or by turns thereof are used to purify the oxide-based solid electrolyte. Or a plasma or corona is adapted for purifying surfaces of the oxide-based solid electrolyte. Finally, the oxide-based solid electrolyte is dried, in step S6. For example, the drying process is performed in 350° C.-750° C.

Through the aforementioned recycling method, the solid-state or quasi-solid lithium batteries are effectively recycled to prevent the environmental pollution of the waste metal-ion batteries. Also, there does not have cracking process during the recycling method. The structure, with original particle size, and original composition of the oxide-based solid electrolyte will not be damaged. For example, the temperature of the heat treatment of the above-mentioned step is lower than the temperature of the oxide-based solid electrolyte to produce crystal variation. And the chemical reagents will not affect the structure or composition of the oxide-based solid electrolyte. Moreover, during the electrochemical reactions, the oxide-based solid electrolyte is only used as an ion transport pathway, and does not participate in the insertion and extraction of metal-ions. Therefore, the recycled oxide-based solid electrolyte would still have the states of the initial used to achieve original phase recycle.

Figure 3:
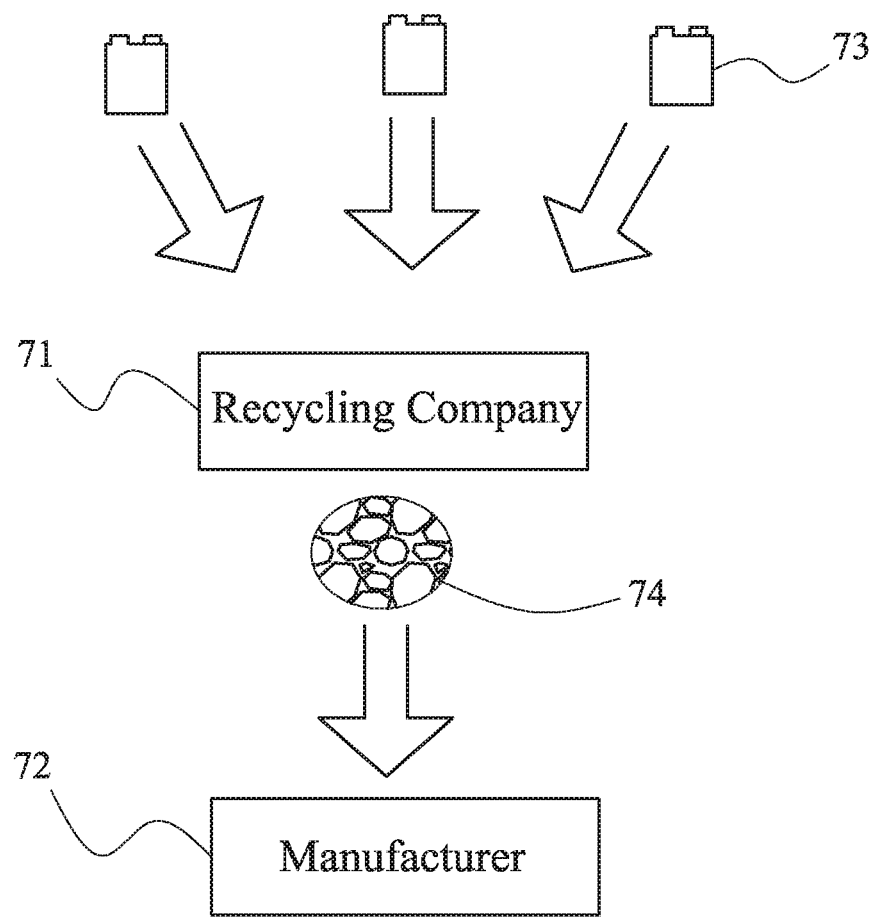
FIG. 3 is a block diagram of an example of a production mode for re-used of the recycling oxide-based solid electrolyte in accordance with the present invention.

Due to the recycled oxide-based solid electrolyte is original phase recycle, the obtained oxide-based solid electrolyte still has the material's states of the initial used. The recycled the oxide-based solid electrolyte can be re-used directly to a new assembly lithium battery in production line. Therefore, a novel production mode is generated. Please refer to FIG. 3, which is a block diagram of an example of a production mode for re-used of the recycling oxide-based solid electrolyte in accordance with the present invention.

The recycling company 71 obtains the original phase oxide-based solid electrolyte 74 by performing the above-mentioned original phase recycling method on the battery 73. Then the original phase oxide-based solid electrolyte 74 is supplied to the manufacturer 72 for a new assembly metal-ion battery. In other words, the manufactured metal-ion battery will include the original phase oxide-based solid electrolyte 74 obtained by the original phase recycling method of the aforementioned steps. In this way, the cost of the solid state electrolyte is greatly reduced, and the manufacturing cost of the solid-state or quasi-solid metal-ion batteries are also greatly reduced. Furthermore, because the used solid-state electrolyte comes from the original phase electrolyte of recycling, the produced battery is a green battery. In other words, the green battery includes the original phase oxide-based solid electrolyte 74 obtained by the original phase recycling method of the aforementioned steps.

Accordingly, this invention provides a recycling method for oxide-based solid electrolyte with original phase, method of fabricating lithium batteries and green batteries thereof, which is adapted to recycle the solid-state or quasi-solid lithium batteries after discard. The oxide-based solid electrolyte is only used as an ion transport pathway, and does not participate in the insertion and extraction of the metal-ions during charge and discharge cycles, and its crystal structure dose not be destroyed. Therefore, the original phase recycle of the oxide-based solid electrolyte is achieved without damage the structure or materials. The recycled the oxide-based solid electrolyte can be re-used to reduce the manufacturing cost of the metal-ion battery.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:
1. A recycling method for oxide-based solid electrolytes with original phase, comprising the following steps:
    step S1: obtaining a battery with an oxide-based solid electrolyte with an original size and an original material's characteristics;
    step S2: disassembling the battery to obtain a processing part including at least one electrode and the oxide-based solid electrolyte;
    step S3: removing an organic substance of the processing part, so that the processing part essentially remains an inorganic substance composition;
    step S4: separating the inorganic substance composition to obtain the oxide-based solid electrolyte; and
    step S5: purifying the oxide-based solid electrolyte to obtain a recycled oxide-based solid electrolyte with the original size and the original material's characteristics.
2. The recycling method of claim 1, wherein the step S3 specifically comprises removing the organic substance of the processing part by a wet or dry process.
3. The recycling method of claim 2, further comprising a step of cleaning the processing part to remove a residual organic substance before the step S4 and after the step S3.
4. The recycling method of claim 1, wherein the step S4 specifically comprises separating the inorganic substance composition via screening by a centrifugal force.
5. The recycling method of claim 1, wherein in the step S5, a deionized water, an organic solvent or by turns thereof are used to purify the oxide-based solid electrolyte.
6. The recycling method of claim 1, wherein the step S5 specifically comprises purifying surfaces of the oxide-based solid electrolyte by a plasma or corona.
7. The recycling method of claim 1, further comprising a step of drying the oxide-based solid electrolyte after the step S5.
8. The recycling method of claim 7, wherein the drying process is performed in 350° C.–750° C.
9. The recycling method of claim 1, wherein the oxide-based solid electrolyte is LLZO (lithium lanthanum zirconium oxide, $Li_7La_3Zr_2O_{12}$).
10. A method of fabricating lithium batteries, which is composed of the oxide-based solid electrolyte with original phase of claim 1.
11. A green battery including an oxide-based solid electrolyte with original phase, which is recycled according to claim 1.

\* \* \* \* \*